United States Patent [19]

Suzuki et al.

[11] Patent Number: 5,740,775
[45] Date of Patent: Apr. 21, 1998

[54] DIESEL ENGINE

[75] Inventors: Takashi Suzuki; Kiyohiro Shimokawa; Haruyuki Yokota; Yugo Kudo; Masatoshi Shimoda; Toshiaki Kakegawa, all of Tokyo, Japan

[73] Assignee: Hino Motors, Ltd., Tokyo, Japan

[21] Appl. No.: 721,244

[22] Filed: Sep. 26, 1996

[30] Foreign Application Priority Data

| Oct. 2, 1995 | [JP] | Japan | 7-278374 |
| Mar. 1, 1996 | [JP] | Japan | 8-071108 |

[51] Int. Cl.$^6$ .................................... F02M 45/02
[52] U.S. Cl. ............................................ 123/299
[58] Field of Search ............................ 123/299, 300, 123/569, 571, 27 R

[56] References Cited

U.S. PATENT DOCUMENTS

| 2,356,627 | 8/1944 | Skaredoff | 123/299 |
| 2,692,587 | 10/1954 | Barber | 123/299 |
| 4,462,376 | 7/1984 | Ripper et al. | 123/571 |
| 4,562,821 | 1/1986 | Ikeda | 123/569 |
| 4,836,161 | 6/1989 | Abthoff et al. | 123/299 |
| 5,115,789 | 5/1992 | Aoyama | 123/569 |
| 5,165,373 | 11/1992 | Cheng | 123/300 |
| 5,402,760 | 4/1995 | Takeuchi et al. | 123/300 |

FOREIGN PATENT DOCUMENTS

| 61066855 | 4/1986 | Japan . |
| 4103866 | 4/1992 | Japan . |
| 4231645 | 8/1992 | Japan . |

OTHER PUBLICATIONS

MTZ Motortechnische Zeitschrift Jan. 1992.

"Homogeneous–Charge Compression–Ignition (HCCI) Engines".

"Application of Heavy Duty Diesel Engine to Future Emission Standards".

"Reducing Particulate and NOx Using Multiple Injecitons and EGR in a D.I. Diesel".

*Primary Examiner*—Willis R. Wolfe
*Assistant Examiner*—Hieu T. Vo
*Attorney, Agent, or Firm*—McCormick, Paulding & Huber

[57] ABSTRACT

A diesel engine comprising a fuel injection device and a controller for controlling the fuel injection device in accordance with an operating condition of the engine. The fuel injection device effects a preliminary injection for injecting fuel into a cylinder during a period from the initial part of an intake stroke to the middle part of a compression stroke and a main injection for injecting fuel into a combustion chamber in the vicinity of a top dead center of the compression stroke, whereby lean mixture is formed and a maximum combustion temperature in the combustion chamber is decreased to suppress generation of NOx and to reduce emission of black smoke.

6 Claims, 4 Drawing Sheets

DIESEL ENGINE

BACKGROUND OF THE INVENTION

1. Field of the Invention

The present invention relates to a diesel engine, and more particularly, it relates to a diesel engine which can improve fuel consumption with simultaneous reduction of NOx and black smoke emission.

2. Prior Art

In order to reduce NOx emission from diesel engines, it is effective to perform "timing retardation" in which generation of NOx is suppressed by delaying a timing of fuel injection, and, in order to reduce emission of black smoke, it is effective to increase a pressure of fuel injection or to use a combustion chamber of re-entrant type.

However, the injection timing retardation for NOx reduction causes the possibility of increasing the emission of black smoke and worsening the fuel consumption. In the case of high pressure injection, since atomization of fuel can be enhanced, the emission of black smoke can be reduced. In this case, however, since a combustion temperature is increased, the generation of NOx is also increased. Thus, it was considered that it is very difficult to reduce the fuel consumption by reducing the emission of black smoke while suppressing the generation of NOx in diesel engines.

Recently, a diesel engine of pre-mixed compression ignition type has been proposed as a mean for solving the above problems. In such a diesel engine of pre-mixed compression ignition type, hydrocarbon fuel is injected into a cylinder in the early stage of a compression stroke, the injected fuel evaporates and mixes with air in the compression stroke to make a homogeneous mixture, and the mixture automatically ignites at the end of the compression stroke. By this combustion method, as is in lean-burn spark ignition engines, emission of black smoke can be prevented while suppressing generation of NOx by forming a homogeneous lean mixture and minimizing fuel consumption deterioration.

However, in such pre-mixed compression ignition type diesel engines in which the fuel is injected in the initial part of the compression stroke, even with special fuel having special firing feature and/or with a special fuel injecting device, the engine can merely be operated in a limited load/speed range. Thus, in the past, the diesel engine of pre-mixed compression ignition type could not be applied to an automobile engine which must be operated in wider load/speed range.

SUMMARY OF THE INVENTION

Problems which the Invention is to Solve

The present invention aims to eliminate the above-mentioned conventional drawbacks, and an object of the present invention is to provide a diesel engine which can improve fuel consumption with simultaneous reduction of NOx and black smoke emission.

Means for Solving the Problems

To achieve the above object, according to the present invention, there is provided a diesel engine comprising an injection device for affecting a preliminary injection for injecting fuel into the cylinder of the engine during a period from the initial part of an intake stroke to the middle part of a compression stroke, and a main injection for injecting fuel into a combustion chamber in the vicinity of a top dead center of the compression, and a controller for controlling the injection device in accordance with an operating condition of the engine.

Further, in the present invention, generation of black smoke can be suppressed more effectively by affecting the main injection by plural times during a period from the end of the compression stroke to the initial part of an expansion stroke.

The diesel engine of the present invention may further comprise a suction air temperature adjusting means for variably controlling a temperature of suction air in accordance with the operating condition of the engine. When such a suction air temperature adjusting means is provided, more stable combustion can be achieved also in a low load region. Incidentally, the suction air temperature adjusting means may be constituted by an exhaust gas recirculation device for variably controlling a flow rate of exhaust gas recirculated from an exhaust passage to an intake passage or a heat exchanger for effecting heat exchange between suction air and exhaust gas flowing through an exhaust passage.

Further, in the present invention, even when a conventional hole type injection nozzle is used, the aimed object can be achieved.

DESCRIPTION OF THE PREFERRED EMBODIMENTS

Figure 1:
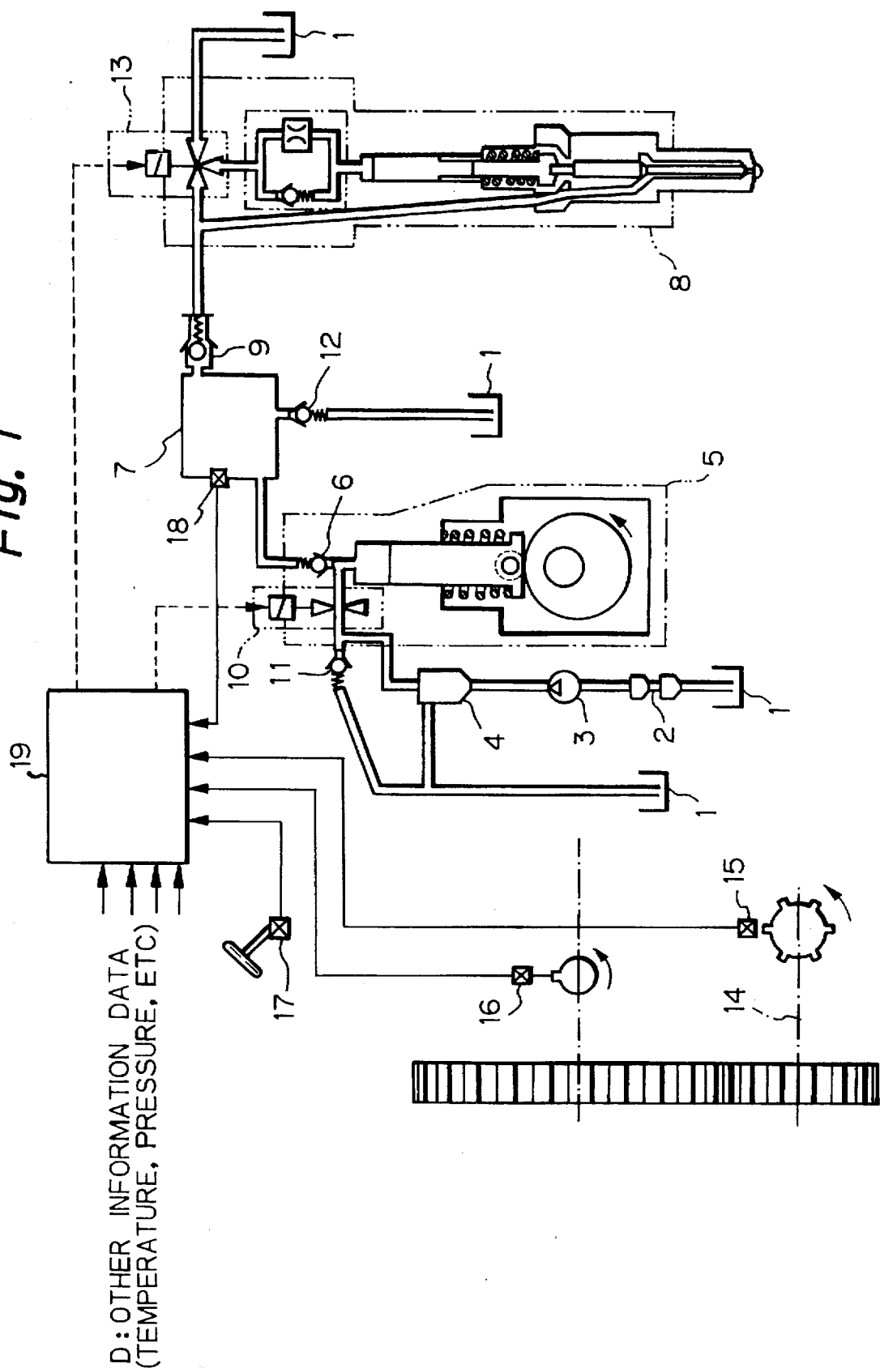
FIG. 1 is a schematic constructional view of a diesel engine according to a preferred embodiment of the present invention.

The present invention will now be explained in connection with embodiments thereof with reference to the accompanying drawings. FIG. 1 is a schematic constructional view of a diesel engine according to a preferred embodiment of the present invention. In FIG. 1, there is provided a supply pump 5 to which fuel is supplied from a fuel tank 1 through a pre-filter 2, a feed pump 3 and a fuel filter 4. A discharge port of the supply pump 5 is connected to a common rail 7 via a check valve 6. An injection nozzle 8 provided in a combustion chamber of the engine is connected to the common rail 7 via a flow limiter 9, thereby constituting a fuel injection device of accumulator type.

The reference numeral 10 denotes an electromagnetic spill valve for keeping a pressure of the common rail 7 to a predetermined value; 11 denotes a relief valve; 12 denotes a pressure limiter for preventing excessive increase in fuel pressure in the common rail 7; and 13 denotes a three-way electromagnetic valve associated with the injection nozzle 8. Signals emitted from an engine rotation sensor 15 associated with a crankshaft 14 of the engine, an engine phase sensor 16, an accelerator position sensor 17 and a pressure sensor 18 associated with the common rail 7 are inputted to a controller 19. Further, other control information data such as temperature information and/or atmospheric pressure information are also inputted to the controller 19.

The controller 19 outputs control signals to the electromagnetic spill valve 10 and the three-way electromagnetic valve 13 in accordance with the various control information data D, thereby controlling an operation of the supply pump 5 and controlling optimum injection amount and injection timing of the fuel from the injection nozzle 8 to the combustion chamber.

The controller 19 can judge the operating condition of the engine on the basis of the signals emitted from the engine rotation sensor 15 and the accelerator position sensor 17. When a preliminary injection signal is emitted from the controller 19, a preliminary injection is effected during a period from the initiation of an intake stroke to the middle part of the intake stroke. On the other hand, when a main injection signal is emitted from the controller 19, a main injection is effected in the vicinity of a top dead center of a compression stroke.

More specifically, as tests, the above-mentioned fuel injection device of accumulator type and a conventional hole type fuel injection nozzle were mounted on a single cylinder diesel engine of direct injection type having displacement of 2000 cc, and 55 cetane diesel fuel popular in Japan was used. And an amount of the fuel corresponding to 50% of an entire amount of fuel to be injected was injected from the injection nozzle into the cylinder in the initial part of the intake stroke in response to the preliminary injection signal emitted from the controller 19, and then the remaining 50% fuel was injected (into the cylinder) in the vicinity of the top dead center of the compression stroke in response to the main injection signal emitted from the controller 19. An opening/closing feature of the injection nozzle is shown in a section "a" of FIG. 2.

In this way, when the amount of the fuel corresponding to 50% of the entire fuel amount was injected in the preliminary injection and the remaining 50% fuel was injected as the main injection in the vicinity of the top dead center of the compression stroke, the fuel injected as the preliminary injection was influenced by flow and turbulence of the suction air so that the fuel was widely spread within the cylinder and was adequately mixed with air. After that as the compression stroke proceeds, the temperature of the suction air was increased, and evaporation of the injected fuel was promoted and lean mixture having equivalence ratio smaller than one (1) was formed.

Since the lean mixture formed in this way includes excessive oxygen and nitrogen, no soot was generated, and, since heat capacity is great, temperature increase due to ignition and compression of fuel is small. NOx formation can be suppressed.

When the remaining fuel was injected on the basis of the main injection signal emitted from the controller 19, the ignition and combustion of the mainly injected fuel was effected.

Figure 2:
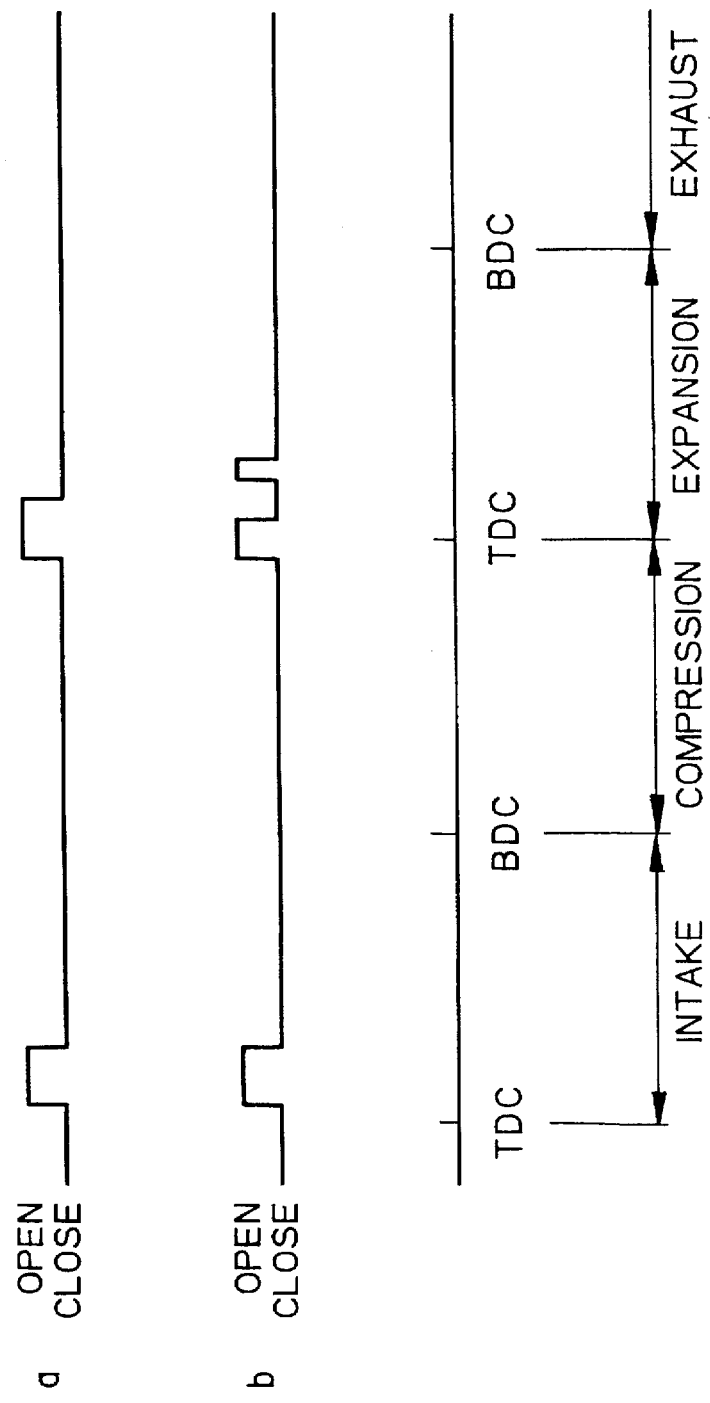
FIG. 2 is a timing chart showing an opening/closing feature of an injection nozzle of FIG. 1.

Since the exhaust gas generated by the combustion of the lean mixture remained in the cylinder to produce an internal EGR effect, the generation of NOx in the combustion of the mainly injected fuel could be suppressed more positively. If there is the possibility of not firing a part of lean mixture after the mainly injected fuel was burned, it was found that, by further injecting a small amount of additional fuel during about 30 degrees after the top dead center of the compression stroke, the lean mixture could be completely burned by the firing of the additional fuel. A section "b" of FIG. 2 shows an opening/closing feature of the injection nozzle 8 when the main injection is effected two times (by dividing it into two). By effecting the main injection two times in this way, perfect combustion could be more expected to achieve combustion with high efficiency and less emission.

Figure 3:
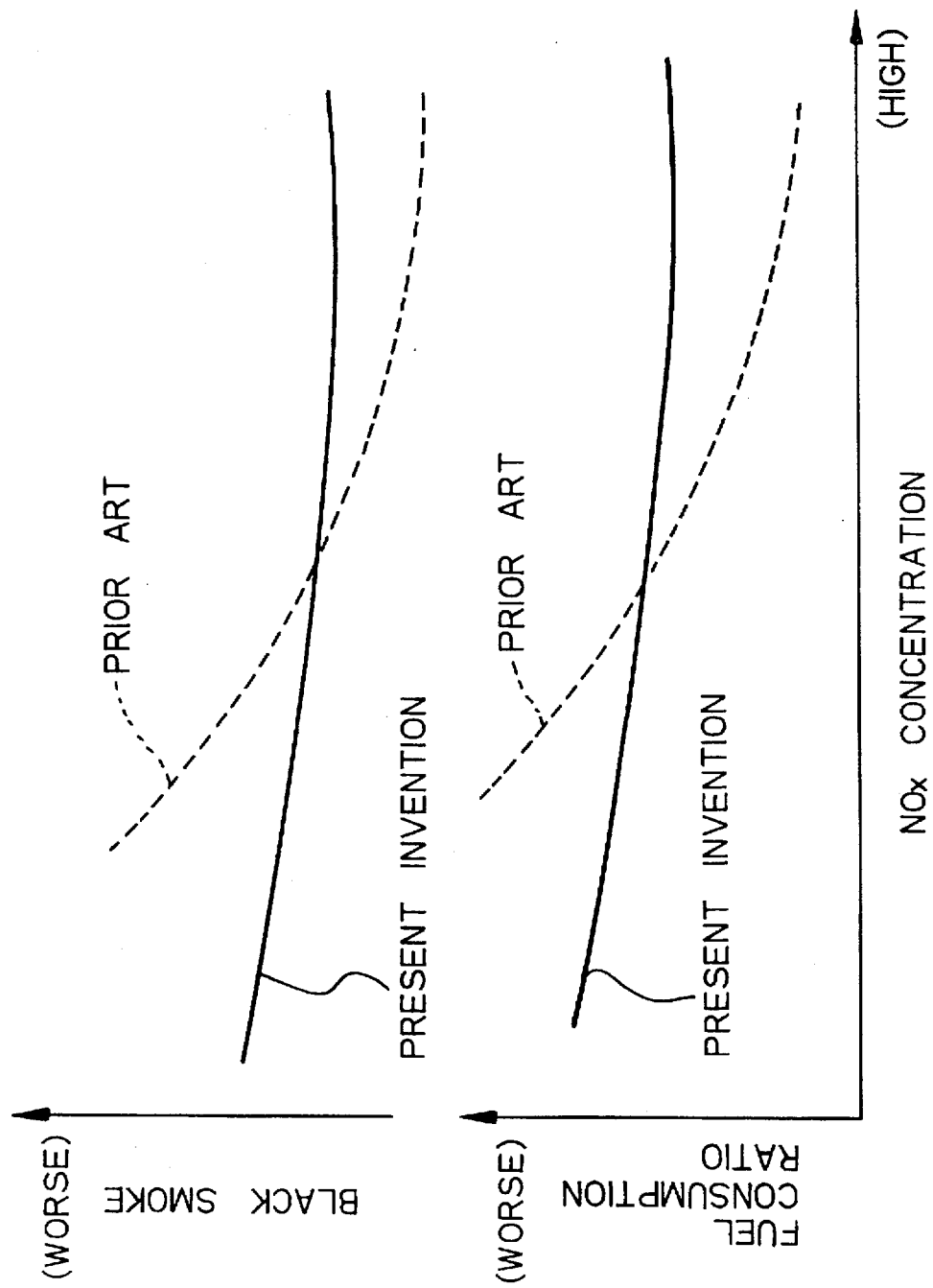
FIG. 3 is graphs showing relations between smoke emission/fuel consumption ratio and NOx concentration in connection with combustion based on the injection feature shown in FIG. 2 and conventional (prior art) combustion.

On the other hand, when the timing of the main injection was delayed on the basis of the conventional timing retardation conception, the exhaust amount of NOx was reduced and emission of black smoke did not increase. When the main injection was effected two times by dividing it into two in this way; as shown in FIG. 3, both black smoke emission and fuel consumption were improved at a low NOx concentration side, with the result that the fuel consumption could be reduced by reducing emission of black smoke while suppressing generation of NOx. Incidentally, even when the timing of the main injection was delayed to the extent that it was conventionally considered not to be able to effect self-operation of the engine, the misfiring did not occur and emission of NOx could be reduced to about a half in comparison with the conventional case.

By the way, in the present invention, as a rule, the fuel is supplied by the preliminary injection and the main injection. However, when the engine is operated in the low load region, if the preliminary injection is effected in the initial part of the intake stroke and the main injection is effected in the vicinity of the top dead center of the compression stroke, since air/fuel ratio of the lean mixture becomes too great, diffusion of combustion flame generated by the preliminary injection cannot be effected smoothly. As a result, it is considered that an unburned portion of the lean mixture is exhausted, thereby increasing emission of HC.

However, as mentioned above, the present invention can be applied to an engine, fuel injection device and fuel which have been normally used. Thus, when the engine is operated in the low load region, the preliminary injection may be omitted and the main injection may be performed to effect combustion as is in a conventional diesel engine, or, when the engine is started under a cold environment, a normal or conventional fuel supplying method may be utilized. In this way, ignition ability of the engine can be ensured and generation of excessive white smoke can be suppressed. Further, in the present invention, injection amounts, injection timings and injection times of the preliminary injection and main injection can be variably controlled on the basis of the operating condition of the engine.

As mentioned above, according to the present invention, since the injection amounts, injection timings and injection times of the preliminary injection and/or main injection can be appropriately set and since the normal fuel injection method as is in the conventional diesel engine can be utilized selectively, the optimum fuel supplying feature can be achieved in accordance with the operating condition of the engine.

By the way, the combustion stability of a diesel engine of pre-mixed compression ignition combustion type greatly depends upon a temperature in the combustion chamber. Thus, by providing a suction air temperature adjusting means for variably controlling a temperature of suction air in accordance with the operating condition of the engine, stable combustion can be realized also in a low load region.

Figure 4:
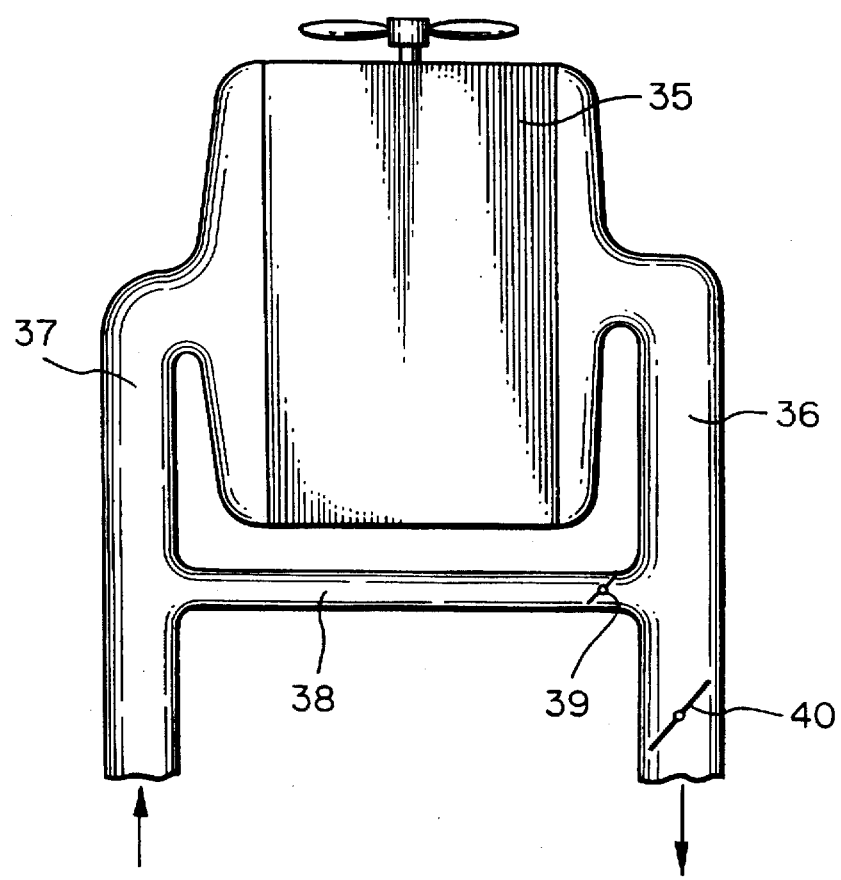
FIG. 4 is a schematic illustration showing an embodiment of a suction air temperature adjusting means.

As the suction air temperature adjusting means for variably controlling a temperature of suction air in accordance with the operating condition of the engine, an exhaust gas recirculation device can be used. For example, as shown in FIG. 4, the exhaust gas recirculation device includes a flow control valve 39 disposed in a recirculation passage 38 extending between an exhaust passage 36 and an intake passage 37 of an engine 35. With this arrangement, a flow rate of the exhaust gas recirculated to the intake passage 37 can be changed by changing an opening area of the flow control valve 39 in accordance with the operating condition of the engine 35. In FIG. 4, the reference numeral 40 denotes an auxiliary valve acting as an exhaust brake valve for correcting a flow control range due to the change in the opening area of the flow control valve 39.

When the suction air temperature adjusting means is constituted by the exhaust gas recirculating device as mentioned above, since the recirculation amount of exhaust gas can be increased to increase the temperature of the suction air in the low load region, the allowable air/fuel ratio which can achieve stable combustion can be shifted toward the dilute side. Accordingly, also in a no load operating region where supply amount of fuel is very small, since the recirculation amount of exhaust gas can be increased to increase the temperature of the suction air, stable combustion can be realized without misfiring.

Incidentally, since the heat capacity of the combustion chamber is increased due to the recirculation of the exhaust gas, the combustion temperature is decreased to suppress generation of NOx. Further, since a part of HC included in the exhaust gas is returned into the suction air due to the recirculation of the exhaust gas and is burned, emission of HC can be further reduced while stabilizing the combustion.

Effect of the Invention

As mentioned above, according to the present invention, since the pre-mixed lean mixture is formed and burned, the fuel consumption can be improved with simultaneous reduction of NOx and black smoke emission.

What is claimed is:

1. A diesel engine comprising:

a fuel injection device; and a controller for controlling said fuel injection device in accordance with an operating condition of the engine, said controller providing a preliminary injection signal wherein a first predetermined amount of fuel is injected into a cylinder of the engine during a period from the initial part of an intake stroke to the middle part of a compression stroke, said controller further providing a main injection signal wherein a second predetermined amount of fuel is injected into a combustion chamber in the vicinity of top dead center of the compression stroke, whereby a maximum combustion temperature in said combustion chamber is decreased to suppress generation of NOx and to reduce emission of black smoke.

2. A diesel engine according to claim 1, wherein said controller causes said fuel injection device to effect the main injection several times during a period from the end of the compression stroke to the initial part of an expansion stroke.

3. A diesel engine according to claim 1, wherein said fuel injection device includes a common rail to which high pressure fuel is supplied and which can accumulate the fuel at a predetermined high pressure level, and an injection nozzle to which the high pressure fuel is supplied from said common rail and which is adapted to inject the high pressure fuel into said combustion chamber, and wherein said injection nozzle cooperates with an electromagnetic valve controlled by a control signal supplied from said controller to control a fuel injection amount and a fuel injection timing.

4. A diesel engine according to claim 1, further comprising a suction air temperature adjusting means for variably controlling a temperature of suction air in accordance with the operating condition of the engine, thereby stabilizing the combustion.

5. A diesel engine according to claim 4, wherein said suction air temperature adjusting means comprises an exhaust gas recirculation device for variably controlling a flow rate of exhaust gas recirculated from an exhaust passage to an intake passage of the engine.

6. A diesel engine according to claim 1, wherein said fuel injection device further injects a small amount of fuel during a crank angle between 20 degrees and 40 degrees after the top dead center of the compression stroke, thereby reducing unburned constituent in the exhaust gas.

* * * * *